(12) United States Patent
Laing et al.

(10) Patent No.: US 9,091,032 B2
(45) Date of Patent: Jul. 28, 2015

(54) CONTAINMENT BERM WITH INTERNAL QUICK LATCH STAYS

(71) Applicant: Custom Chemical Solutions, LLC, Cody, WY (US)

(72) Inventors: Charles R. Laing, Cody, WY (US); Ryan L. Roemmich, Cody, WY (US); Reuben J. Spomer, Cody, WY (US)

(73) Assignee: Custom Chemical Solutions, LLC, Cody, WY (US)

( * ) Notice: Subject to any disclaimer, the term of this patent is extended or adjusted under 35 U.S.C. 154(b) by 108 days.

(21) Appl. No.: 14/145,827

(22) Filed: Dec. 31, 2013

(65) Prior Publication Data

US 2015/0184351 A1  Jul. 2, 2015

(51) Int. Cl.
*E02B 8/00* (2006.01)
*B65D 90/24* (2006.01)
*F16N 31/00* (2006.01)
*B08B 17/02* (2006.01)

(52) U.S. Cl.
CPC . *E02B 8/00* (2013.01); *B65D 90/24* (2013.01); *F16N 31/006* (2013.01); *B08B 17/025* (2013.01)

(58) Field of Classification Search
CPC combination set(s) only.
See application file for complete search history.

(56) References Cited

U.S. PATENT DOCUMENTS

| | | | |
|---|---|---|---|
| 5,924,461 A | 7/1999 | Shaw et al. | |
| 6,019,243 A | 2/2000 | Marino | |
| 6,092,686 A * | 7/2000 | Shaw et al. | 220/573 |
| 6,880,721 B1 * | 4/2005 | Barrett et al. | 220/573 |
| 7,854,330 B2 | 12/2010 | Olsta et al. | |
| 8,464,885 B2 * | 6/2013 | Ramp et al. | 220/9.2 |
| 2004/0169041 A1 * | 9/2004 | Van Romer | 220/573 |
| 2008/0152431 A1 * | 6/2008 | Ramp et al. | 405/52 |
| 2012/0000914 A1 | 1/2012 | Barrett et al. | |

OTHER PUBLICATIONS

AbsorbentsOnline.com, Oil Spill Containment Spill Berms, Jul. 2013.
AOVZ International, aovz.com, SCP Berms (aovz.com/spillcontainmentberms.php), Jul. 2013.
Basic Concepts, Inc., basicconcepts.com, Quick Spill Containment Berm, Jul. 2013.
Granite Environmental, Inc., erosionpollution.com, Spill Containment Product Variety, Jul. 2013.
Husky Portable Containment, huskyportable.com, Jul. 2013.
Interstate Products, interstateproducts.com, Spill Containment Berms, Jul. 2013.
Pact Tec Inc., pactecinc.com, Spill Berms, Jul. 2013.

* cited by examiner

*Primary Examiner* — Frederick L Lagman
*Assistant Examiner* — Kyle Armstrong
(74) *Attorney, Agent, or Firm* — Antoinette M. Tease

(57) ABSTRACT

A containment berm comprising a containment material that is durable, flexible and chemically resistant and configured to provide at least a floor and four walls of the berm and a plurality of quick latch stays situated around the perimeter of the berm, each quick latch stay comprising a first stay member, second stay member, third stay member, latch block, and flexible connecting member. To engage the quick latch stay, a distal end of the second stay member is inserted underneath a bottom end of the latch block.

9 Claims, 7 Drawing Sheets

CONTAINMENT BERM WITH INTERNAL QUICK LATCH STAYS

BACKGROUND OF THE INVENTION

1. Field of the Invention

The present invention relates generally to the field of containment berms, and more specifically, to a containment berm with internal stays that is quick and easy to install and has no removable parts. The internal stays are coupled to a flexible, durable and chemically resistant material that forms the body of the berm.

2. Description of the Related Art

Most hydraulic fracturing rigs experience problems with the portable secondary containment berms that are used to contain spills from blender trucks (which blend and pump proppant slurry). The berms used under these trucks are typically designed with relatively short walls and are intended to contain all the hazardous chemicals blended, used, and sometimes leaked from the blender trucks.

One of the main problems with conventional containment berms is that the stay systems that support the walls of the berm are easily damaged and readily collapsible, allowing the hazardous material to leak out and contaminate the ground surface. In addition, most conventional berms require more than one person, to install Furthermore, to the extent they incorporate removable parts, these berms are more difficult to install and transport.

The present invention solves these problems by providing a system comprised of a series of strategically placed quick latch stays, each of which incorporates four different TEFLON® inserts heat-welded inside of a flexible and durable geomembrane material. The quick latch berm of the present invention is easily installable by one person and contains no removable parts.

Other types of containment berms use aluminum, lead, or steel bracing systems to provide rigidity to the berm; the problem with these types of systems, however, is that if the walls are driven over (by a truck) before they are properly lowered (which happens regularly), the metallic brace punctures the geomembrane material and creates a permanent hole requiring repair. After such an event, the metallic brace is permanently bent. Braces that are permanently bent are no longer of any use, and the wall in the damaged area becomes flimsy and flawed (partially collapsed). As a consequence, the berm is likely to be non-compliant with U.S. Environmental Protection Agency regulations.

With the TEFLON® stay of the present invention, the berm wall can be driven directly over without properly lowering the walls, and no permanent damage will be done to the geomembrane material or the stay itself. The TEFLON® stay bends but does not break, even under extreme temperatures. After approximately fifteen minutes, the TEFLON® stay will revert back to its original shape. The TEFLON® material is hard enough to support the berm walls and structure as a whole but not quite hard enough to puncture the geomembrane material. As a result, the quick latch berm is always in good shape and safe and efficient to use even when mistreated.

Collapsed berm walls are caused not only by bent stays but also by hoses extending from the blender trucks. These hoses often weigh in excess of one hundred pounds and cannot be supported by a frameless wall design. To address this problem, the present invention provides an optional hose bridge that may be used with the quick latch berm to support such hoses. The hose bridges of the present invention are made by wrapping two large foam blocks in a liner material and then connecting the two covered blocks with a piece of liner material that is heat-welded onto the top of both blocks, leaving a gap in the middle. This gap in the hose bridge straddles the wall of the berm so that there is a geomembrane-covered foam block on either side of the berm wall. This configuration allows the crew members to lay multiple hoses on the hose bridge at one time. (Most conventional hose bridges accommodate only one or two hoses.) The hose bridge of the present invention can be made in any desired length. If the length of the hose bridge extends across one or more of the quick latches, then there is spacing between the foam blocks to allow the hose bridge to hug either side of the wall (see FIGS. 9 and 11, reference number 12b).

Examples of containment berms with relatively short side walls intended to contain leaks or spills from vehicles include: U.S. Pat. No. 5,924,461 (Shaw et al., 1999) entitled "liquid Containment Apparatus With Flexible Side Wall"; U.S. Pat. No. 6,019,243 (Marino, 2000) entitled "Spill Containment Receptacle for Use With Tank Transports"; and U.S. Patent Application Pub. No. 2012/0000914 (Barrett et al.) entitled "Fluid controlled Containment Berm System." U.S. Pat. No. 7,354,330 (Olsta et al. 2010) describes a contaminant-reactive geocomposite mat for controlling contaminants in soil or water while at the same time allowing passage of non-contaminated water therethrough. None of these inventions provides the structural and functional advantages of the present invention, as discussed more fully below.

BRIEF SUMMARY OF THE INVENTION

The present invention is a containment berm comprising: a containment material that is durable, flexible and chemically resistant, the containment material configured to provide at least a floor and four walls of the berm, the walls forming a perimeter of the berm, the perimeter having an inside surface and an outside surface; a plurality of quick latch stays situated around the perimeter of the berm, each quick latch stay comprising a first stay member, a second stay member, a third stay member, a latch block, and a flexible connecting member; wherein the first stay member extends vertically on the outside surface of the perimeter and comprises a stay insert covered by at least one layer of geomembrane material that is heat-welded onto the outside surface of the perimeter; wherein the second stay member is comprised of a stay insert covered on both sides by a geomembrane material and joined to the floor of the berm by a material hinge comprised of geomembrane material; wherein the third stay member is situated on the floor of the berm and extends from an inside corner of the berm to a point between the material hinge and the inside corner of the berm and comprises a stay insert at least partially covered by a geomembrane material that is heat-welded onto the floor of the berm; wherein the latch block is situated on the inside surface of the perimeter proximate to a top edge of the perimeter and comprises a stay insert covered by at least one layer of geomembrane material that is heat-welded onto the inside surface of the perimeter; wherein the connecting member is comprised of at least one layer of geomembrane material that is connected at one end to the second stay member and at another end to the inside surface of the perimeter directly underneath the latch block; and wherein to engage the quick latch stay, a distal end of the second stay member is inserted underneath a bottom end of the latch block.

In a preferred embodiment, the geomembrane material comprising the floor and walls of the berm is black, and the geomembrane material of the quick latch stays is a contrasting color. Preferably, the stay inserts of the first stay member, second stay member, third stay member and latch block are comprised of TEFLON®. The stay insert of the third stay member is preferably shorter than the stay inserts of the first and second stay members. The stay insert of the latch block is preferably thicker than the stay inserts of the first stay member, second stay member and third stay member. One end of the third stay member is preferably open to the atmosphere to allow moisture to escape from inside of the third stay member.

In a preferred embodiment, the invention further comprises one or more hose bridges, each hose bridge being comprised of a first foam block and a second foam block that are joined by a piece of geomembrane material that extends from a top inner edge of the first foam block to a top inner edge of the second foam block and that straddles a wall of the berm. In an alternate embodiment, the invention further comprises a hose bridge, each hose bridge being comprised of a first side and a second side, the first side of the hose bridge being situated along the outside surface of the perimeter, and the second side of the hose bridge being situated along the inside surface of the perimeter, the first side of the hose bridge comprised of a foam block, and the second side of the hose bridge being comprised of one or more foam blocks joined together by a geomembrane material that extends from a top lateral edge of one foam block to a top lateral edge of another foam block, the first and second sides of the hose bridge being joined by a geomembrane material that extends from a top inner edge of the first side of the hose bridge to a top inner edge of the second side of the hose bridges and that straddles a wall of the berm.

In an alternate embodiment, the invention is a containment berm comprising: a containment material that is durable, flexible and chemically resistant, the containment material configured to provide at least a floor and four walls of the berm, the walls forming a perimeter of the berm, the perimeter having an inside surface and an outside surface; a plurality of quick latch stays situated around the perimeter of the berm, each quick latch stay comprising a first stay member, a second stay member, a third stay member, a latch block, and a flexible connecting member; wherein the first stay member extends vertically on the outside surface of the perimeter and comprises a stay insert covered by at least one layer of geomembrane material that is heat-welded onto the outside surface of the perimeter; wherein the second stay member is comprised of a stay insert covered on both sides by a geomembrane material and joined to the floor of the berm by a material hinge comprised of geomembrane material; wherein the third stay member is situated on the floor of the berm and extends from an inside corner of the berm to a point between the material hinge and the inside corner of the berm and comprises a stay insert at least partially covered by a geomembrane material that is heat-welded onto the floor of Use berm; wherein, the latch block is situated on the inside surface of the perimeter proximate to a top edge of the perimeter and comprises a stay insert covered by at least one layer of geomembrane material that is heat-welded onto the inside surface of the perimeter; wherein the connecting member is comprised of at least one layer of geomembrane material, that is connected at one end to the second stay member and at another end to a bottom end of the latch block; and wherein to engage the quick latch stay, a distal end of the second stay member is inserted underneath a bottom end of the latch block.

REFERENCE NUMBERS

1 Quick latch containment berm
2 Floor (of containment berm)
3 End wall (of containment berm)
4 Side wall (of containment berm)
5 Quick latch stay
6 Latch block
6a TEFLON® insert (in latch block)
7 First stay member
7a TEFLON® insert (in first stay member)
8 Second stay member
8a TEFLON® insert (in second stay member)
8b Material hinge (in second stay member)
9 Third stay member
9a TEFLON® insert (in third stay member)
10 Connecting member
11 Hem
12 Hose bridge
12a First embodiment of hose bridge (foam blocks without gaps)
12b Second embodiment of hose bridge (foam blocks with gaps)

DETAILED DESCRIPTION OF INVENTION

The present invention is quick and easy to install—simply throw it on the ground, roll it out, and secure the latches in place. As noted above, the berm can be installed by one person, requires no tools, and has no removable parts that might be misplaced or broken. Although the present invention is not limited to any particular dimensions, the side walls are preferably eight, thirteen or eighteen inches high, and the internal quick latch stays are preferably positioned twenty-four to thirty-four inches apart.

To construct the berm, a large piece of geomembrane material is cut to accommodate the desired size of berm. The outer edge of the material which will become the top of the side and end wall, is then hemmed (preferably two inches) all the way around. Next, the material is cut where the corners will be formed, and the corners are pulled in and heat-welded into place to create the desired wall height.

Once the body of the berm (that is, the floor and walls) has been formed, the quick latch stays are heat-welded onto the interior of the berm. Each quick latch stay is comprised of three TEFLON®-reinforced stay members, a latch block, and a flexible connecting member. Although TEFLON® is the preferred material for the stay inserts, any other fluorinated hydrocarbon polymer material may be used. The first and second stay members and the latch block of each quick latch stay are preferably yellow or another color that contrasts sharply with the color (preferably black) of the body of the berm.

The first stay member comprises a ⅜-inch duck TEFLON® stay insert (see FIGS. 7A-7D, reference number 7a) that extends vertically from the bottom to the top of the exterior wall of the berm. The TEFLON® stay insert is sandwiched between two layers of geomembrane material and heat-welded onto the exterior wall of the berm. Alternately, the TEFLON® stay insert could be covered by a single layer of geomembrane material and heat-welded directly onto the exterior wall of the berm. All of the TEFLON® inserts in the present invention (that is, those in the first stay member, latch block, second stay member and third stay member) are preferably one inch wide.

The latch block is comprised of a ¾-inch thick TEFLON® stay insert (see FIGS. 7A-7D. reference number 6a) that is preferably three inches long. The TEFLON® stay insert is tightly wrapped (or covered) in a geomembrane material that is heat-welded into place at or near the top of the interior berm wall. For example, on a thirteen-inch wall, the latch block is preferably positioned at the top of the interior berm wall. On an eighteen-inch wall, the latch block may be positioned five inches from (below) the top of the berm wall. This allows the quick latch stays to be manufactured in a standard size for berms of different heights.

The second stay member is comprised of a ⅜-inch thick TEFLON® stay insert (see FIGS. 7A-7D, reference number 8a) sandwiched between two layers of a geomembrane material. The geomembrane material that encompasses the hard TEFLON® stay insert is cut longer than the TEFLON® piece on one end. This slack in the geomembrane material is heat-welded onto the floor of the berm, with the geomembrane material-encompassed TEFLON® stay insert leaning toward the interior berm wall and latch block. This unreinforced piece of geomembrane material is situated so that the TEFLON®-reinforced part of the stay member catches tightly under the latch block when pushed into latching position. This creates a firm, secure closure system that is easy to latch and detach.

The second stay member described above is preferably connected to the interior wall of the berm by a connecting member comprised of a strip of doable-layered geomembrane material that is heat-welded on one end to the second stay member approximately one-third of the way up the stay member from the floor. The other end of this double-layered geomembrane material is heat-welded to the inside surface of the wall directly underneath the latch block. (Alternately, the other end of the connecting member could be heat-welded to the bottom end of the latch block.) This flexible, unreinforced (it has no internal TEFLON® insert) geomembrane strip assists with holding the walls of the berm in the case of a spill; that is, when pressure is exerted against the interior walls of the berm, both the second stay member and this double-layered geomembrane strip serve to keep the walls of the berm upright. This geomembrane strip also creates a light, pulling force from the wall and latch block to the second stay member when it is in a latched position. This helps support the wall and adds to the overall rigidity of the system. It also helps align the upper end of the second stay member directly underneath the latch block.

The third stay member comprises a fourth TEFLON® stay insert (see FIGS. 7A-7D, reference number 9a) that is ¼-to ⅜-inch thick and preferably cut shorter than the stay inserts of the first and second stay members. This stay insert, like the other stay inserts, is sandwiched between two layers of geomembrane material. It is placed directly perpendicular to the berm wall and heat-welded onto the floor of the berm. (Alternately, the stay insert could be covered by a single layer of geomembrane material and heat-welded onto tire floor of the berm.) This stay insert extends from the bottom of the interior wall (where it meets the floor) to a point just short of the base of the second stay member. The third stay member gives the floor firmness and strength and provides the whole system the sturdiness it needs in windy conditions.

The quick latch berm of the present invention is superior to prior art containment berm designs because it will not be bent out of shape or punctured by its own materials over extended periods of rough use. With the optional hose bridges, the berm can accommodate any number of hoses. The berm is easy to set up and take down, requires practically no assembly, and has no loose pieces. When it is time to move the berm, the latches are easily detached and the berm folded and rolled up for transport to the next job site. By situating all of the stays internally to the berm, tripping hazards are avoided, and there is no need to dig into the ground to anchor any externally placed braces. These and other features of the present invention are discussed more fully below.

Figure 1:
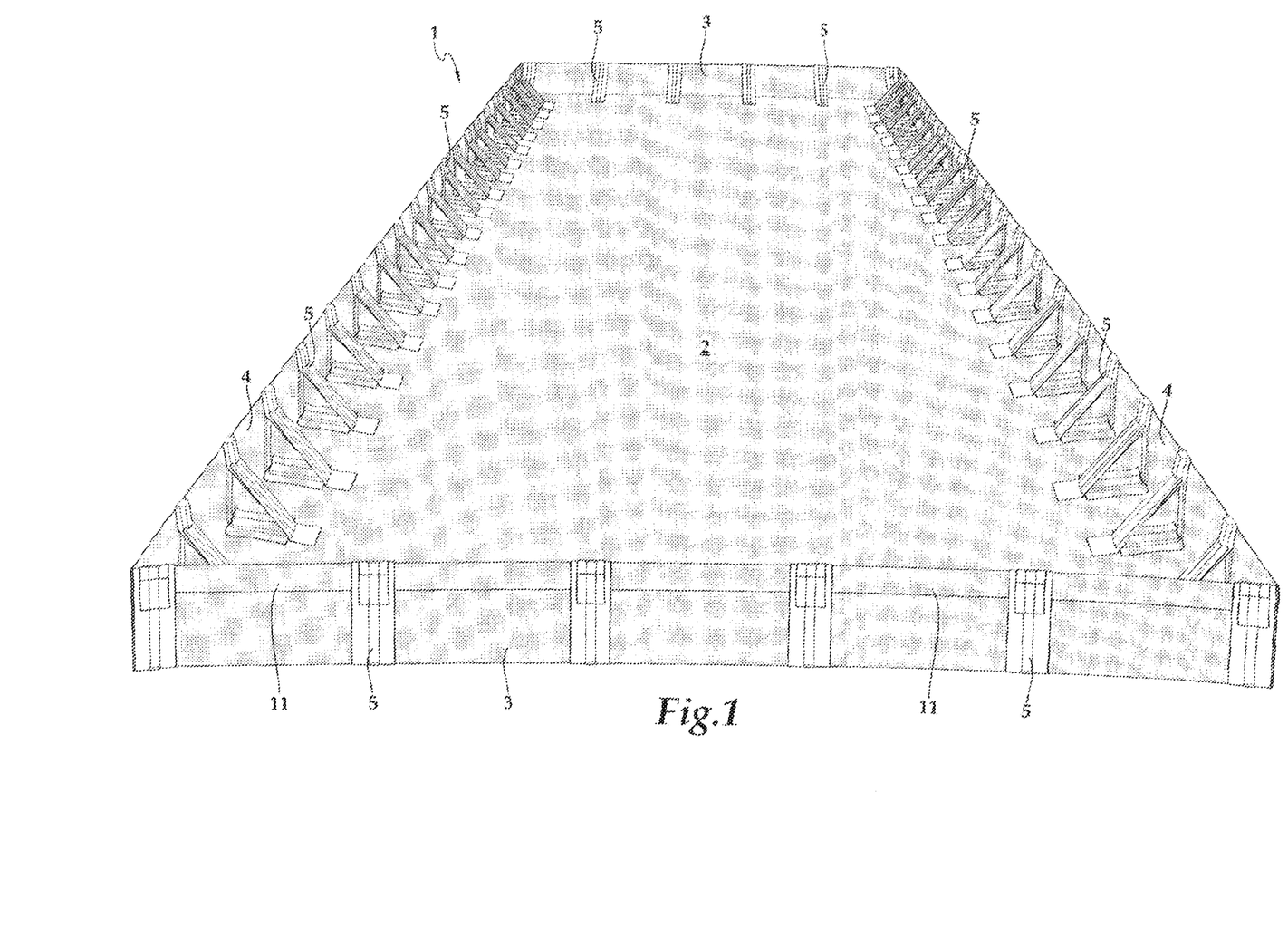
FIG. 1 is a perspective view of the full berm shown fully installed.

FIG. 1 is a perspective view of the full berm shown fully installed. As shown in this figure, the quick latch containment berm 1 is comprised of a floor 2, two end walls 3, and two side walls 4. The quick latch stays 5 are positioned along the end 3 and side 4 walls and are preferably evenly spaced. A stay 5 is preferably located on each end (right and left) of the end wall 3. This is so that the corners of the end wall 3 will lay flat when the end wall is in the flattened position shown in FIG. 8.

The floor 2 and walls 3, 4 of the containment berm are preferably comprised of a geomembrane material that is flexible, durable and chemically resistant. One example of a suitable material is XR-5™ manufactured and sold by Seaman Corporation of Wooster, Ohio. In a preferred embodiment, the floor, walls and third stay member are all black, whereas the first and second stay members and latch block are yellow (or a similarly contrasting color). This is so that the quick stay latches are visually set apart from the rest of the containment berm to make is less likely that a truck or other vehicle operator will run over them.

Figure 2:
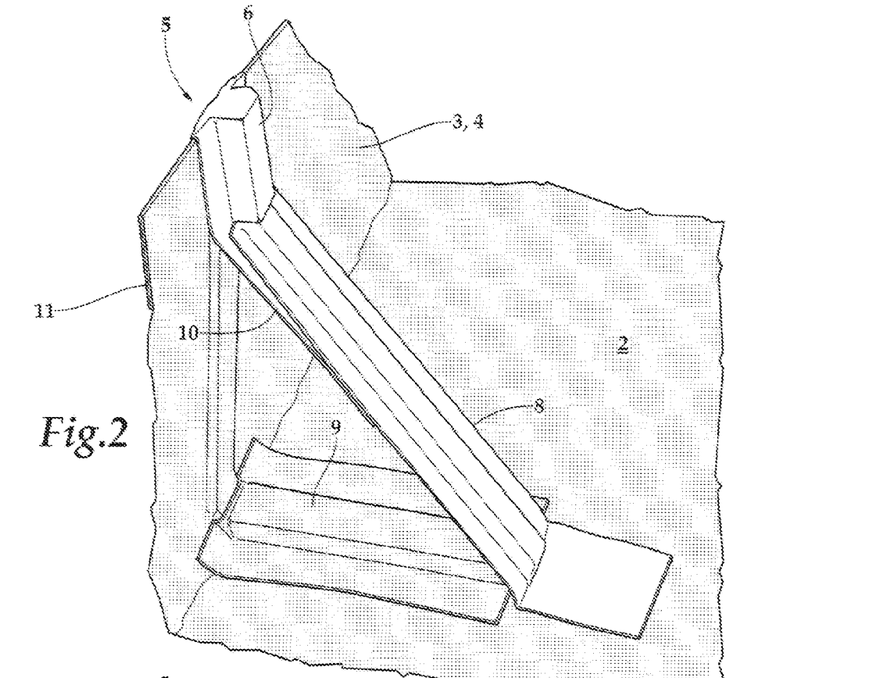
FIG. 2 is a perspective view of a single stay shown in a latched position.

FIG. 2 is a perspective view of a single stay shown in a latched position. This figure shows the latch block 6, second stay member 8 and third stay member 9. Also shown is the connecting member 10. Each of these components is described above. Note that the length of the TEFLON® insert (not shown) in the third stay member 9 is preferably shorter than the length of the TEFLON® inserts in the first stay member 7 (not shown) and second stay member 8, as noted above, to provide the most stable triangular configuration for the quick latch stay. (The height of the stay is preferably greater than the width of the stay.) Because the wall 3, 4 is thirteen (13) inches high in this figure, the latch block 6 is situated at the very top of the wall.

Figure 3:
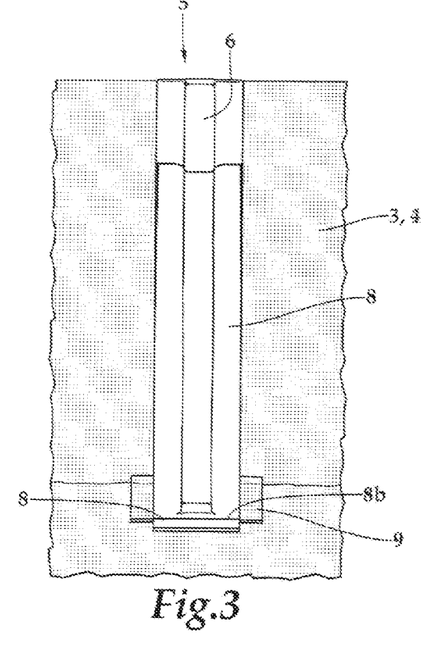
FIG. 3 is a from view of the stay shown in FIG. 2 taken from the inside of the berm.

FIG. 3 is a front view of the stay shown in FIG. 2 taken from the inside of the berm. Although the connecting member 10 is not visible in this figure, as noted above, it serves to align the upper end of the second stay member 8 directly underneath the latch block 6 when the stay is in a latched position. This figure and other figures show the contrast between the black and yellow geomembrane material by depicting the black geomembrane material with a stippling pattern.

Figure 4:
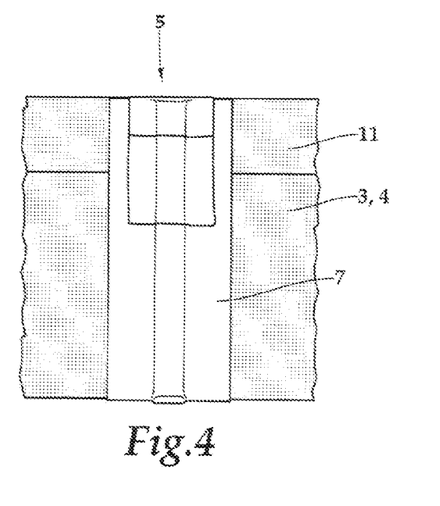
FIG. 4 is a rear view of the stay shown in FIG. 2 taken from the outside of the berm.

FIG. 4 is a rear view of the stay shown in FIG. 2 taken from the outside of the berm. This figure shows the first stay member 7 (with TEFLON® stay insert), which extends from the bottom to the top of the wall 3, 4.

Figure 5:
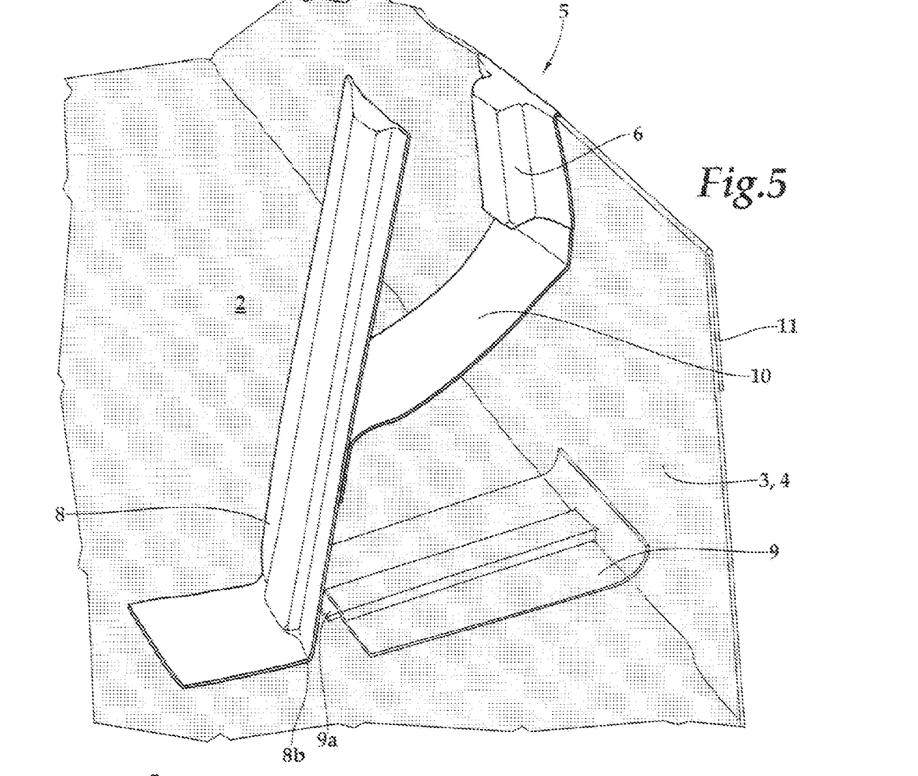
FIG. 5 is a perspective view of a single stay shown in a disengaged position.

FIG. 5 is a perspective view of a single stay shown in a disengaged position. In this position, the upper end of the second stay member 8 has been moved out from underneath the latch block 6 and rotated inward. The second stay member 8 comprises a material hinge 8b that is formed by the welding of the unenforced geomembrane material of the second stay member to the floor 2 of the berm. (As used herein the "proximal end" of the second stay member is the end that comprises the material hinge, and the "distal end" of the second stay member is the end that fits underneath the latch block.) The second stay member rotates at this hinge 8b. Note that this hinge 8b is not connected in any way to the third stay member 9, which is completely separate from the second stay member 8. In fact, the third stay member 9 is preferably open at one end (the end that is closest to the base of the second stay 8) to allow moisture to escape from the pocket in which the TEFLON® stay insert 9a lies.

This figure also shows the two-inch hem 11 in the geomembrane material extending around the perimeter of the side and end walls.

Figure 6:
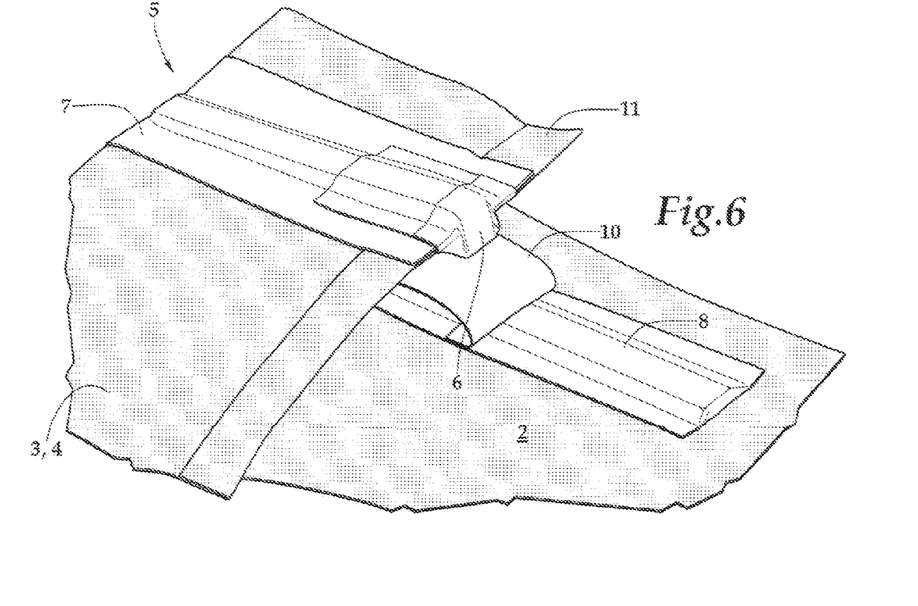
FIG. 6 is a perspective view of a single stay shown in a fully collapsed position.

FIG. 6 is a perspective view of a single stay shown in a fully collapsed position. As shown in this figure, the configuration of the quick latch 5 allows the wall 3, 4 to lie flat against the floor 2 of the berm when the latch is disengaged. This allows a vehicle to drive over the end wall (see FIG. 8).

Figure 7A:
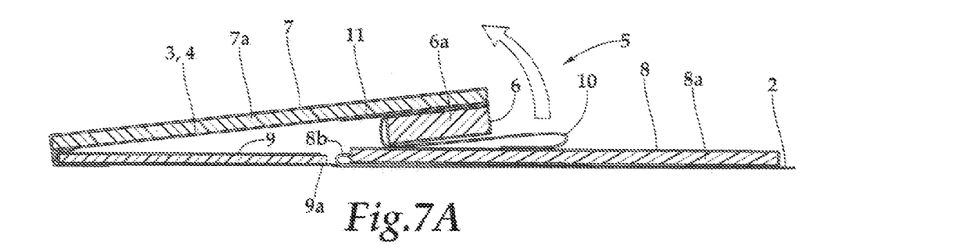
FIG. 7A is a section view of a single stay shown in a fully collapsed position.
Figure 7B:
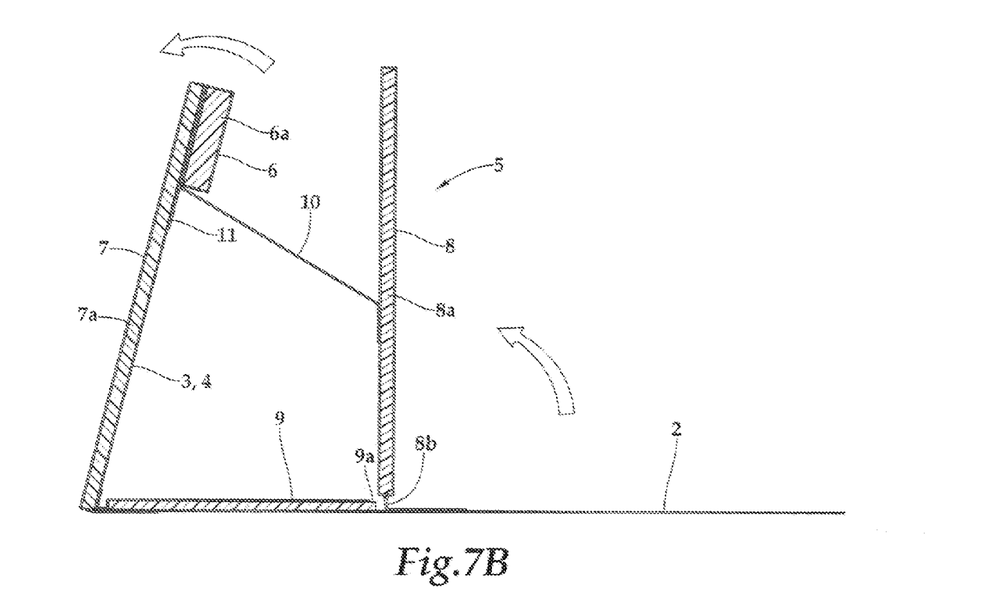
FIG. 7B is a section view of a single stay shown in a disengaged but upright position.
Figure 7C:
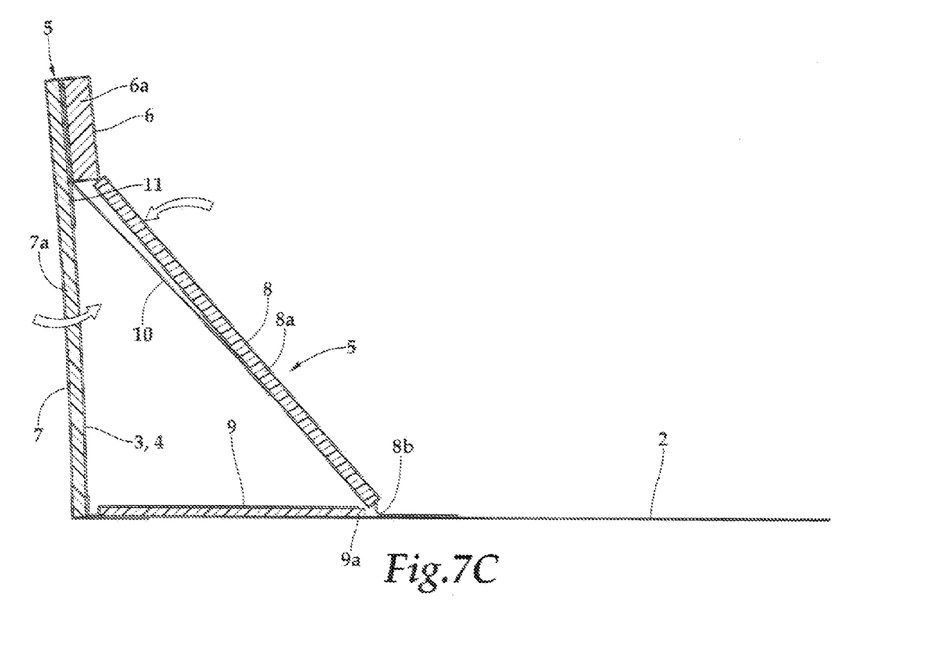
FIG. 7C is a section view of a single stay shown at the moment of engagement with the latch block on the berm wall.
Figure 7D:
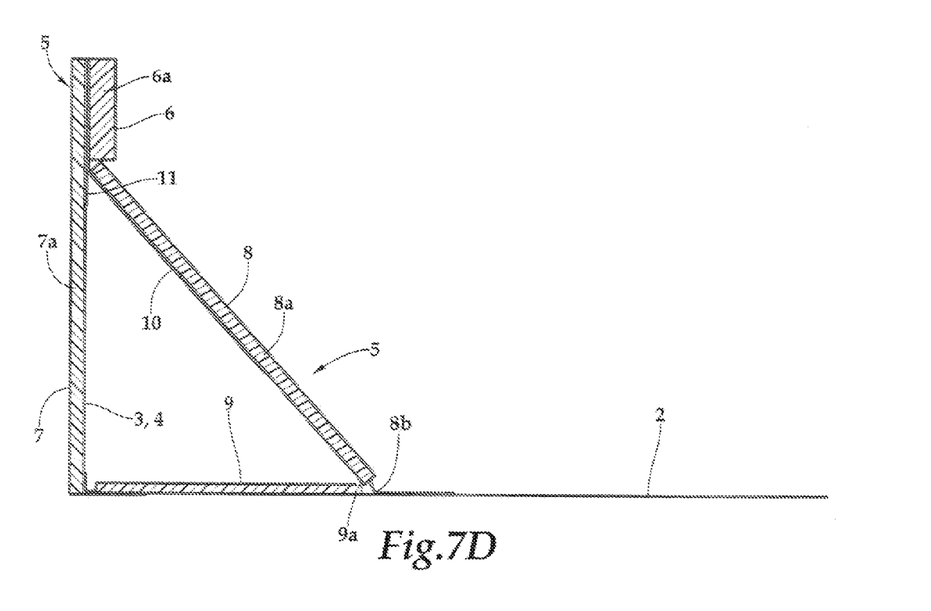
FIG. 7D is a section view of a single stay shown in a latched position.

FIGS. 7A-7D illustrate the process by which the quick latch stay 5 is moved from a fully flattened to a latched position, in FIG. 7A, the quick latch stay is in a fully flattened position. In FIG. 7B, the second stay member 8 has been rotated at the material hinge 8b so that it is in an upright position. In FIG. 7C, the wall 3, 4 is bent slightly outward so that the upper end of the second stay member 8 can be inserted underneath the latch block 6. The fact that the first stay member 7 is comprised of a TEFLON® stay insert allows the wall to flex in this manner. In FIG. 7D, the stay is in a latch position, with the upper end of the second stay 8 fully wedged underneath the latch block and the wall 3, 4 in a fully upright position (i.e., not bent outward). Again, the TEFLON® insert of the first stay member 7 causes the wall to flex back to a fully upright position.

Figure 8:
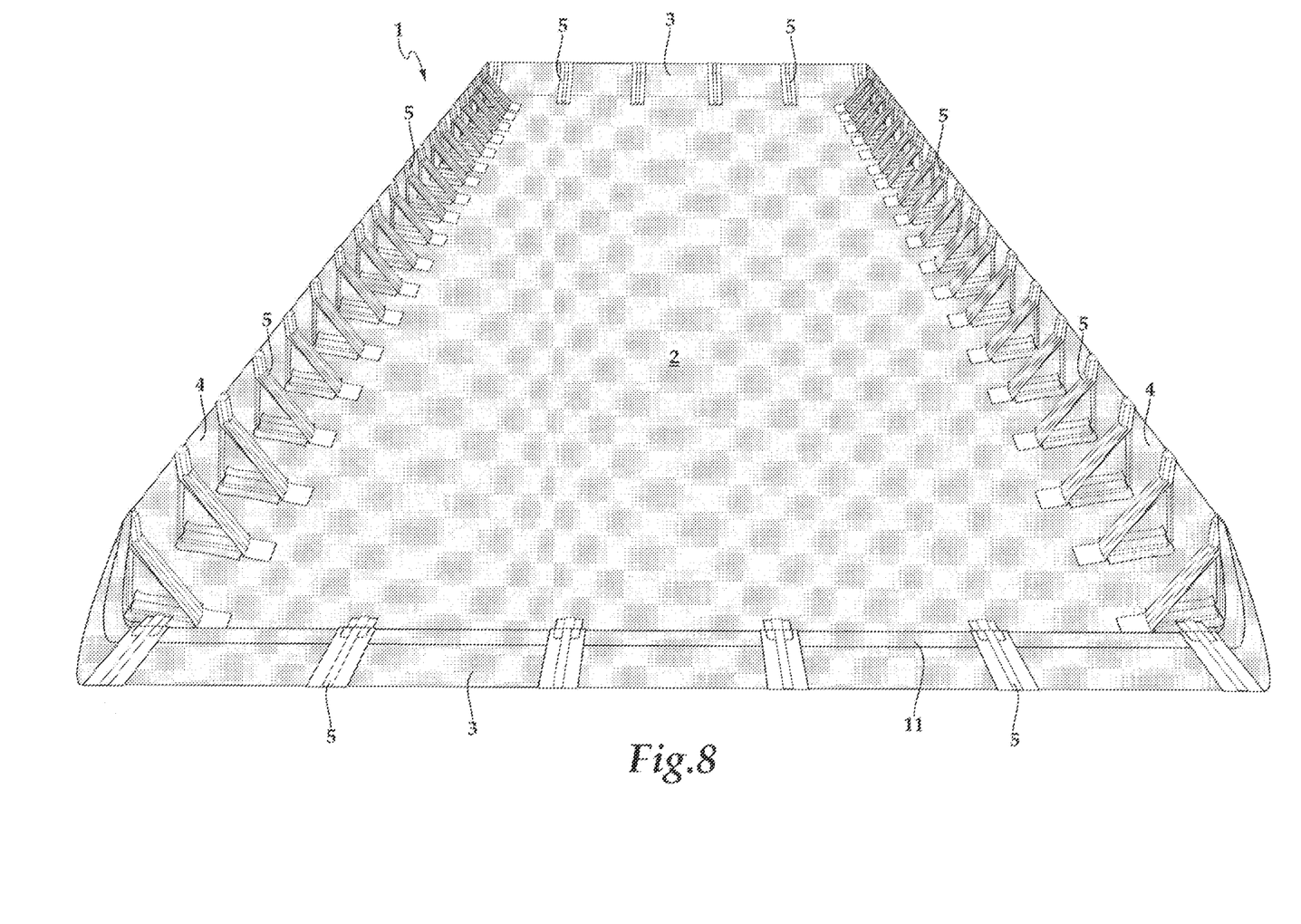
FIG. 8 is a perspective view of the full berm with one end wall fully collapsed.

FIG. 8 is a perspective view of the foil berm with one end wall fully collapsed. In this figure, one end wall 3 has been fully collapsed to allow a vehicle to drive onto the containment berm, as described above.

Figures 9, 10, 11:
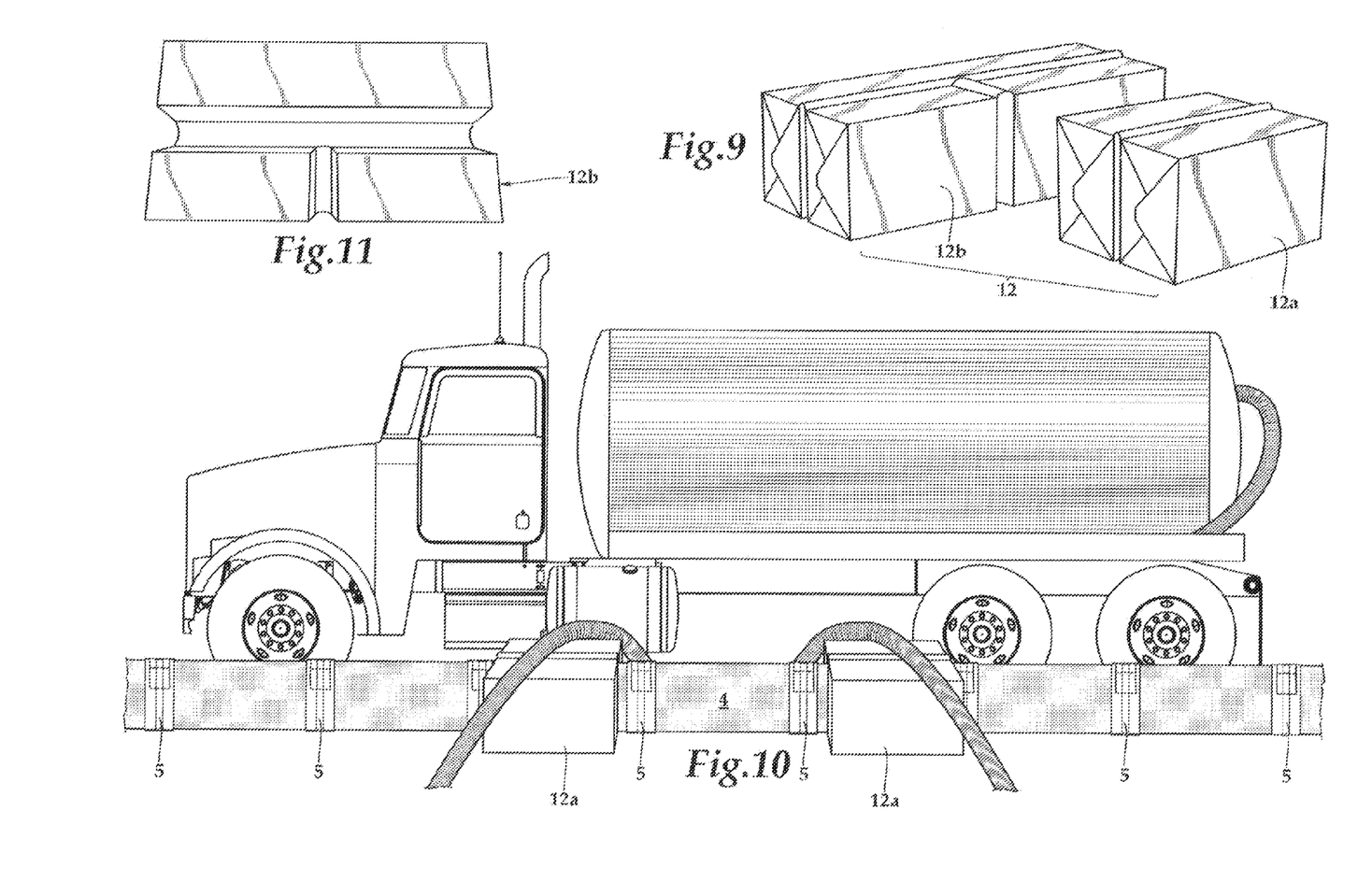
FIG. 9 is a perspective view of a pair of hose bridges.
FIG. 10 is a perspective view of a track situated within the berm with the hose bridges installed over a side wall.
FIG. 11 is a bottom perspective view of the longer length hose bridge.

FIG. 9 is a perspective view of a pair of hose bridges. As shown in this figure, the optional hose bridges 12 come in different lengths. In the shorter length, the hose bridge 12a fits in between the quick latch stays 5, as shown in FIG. 10. In the longer length, the hose bridge 12b may span a length of wall 3, 4 that includes more than one quick latch stay 5. In the latter case, the hose bridge 12b includes cut-outs to accommodate the quick latch stays (see FIGS. 9 and 11). The construction of the hose bridges is discussed above. Note that each pair of foam blocks is joined by a piece of liner material that extends from the top inner edge of one foam block to the top inner edge of the adjacent foam block. This piece of liner material straddles the top of the berm wall 3, 4 when the hose bridges 12 are used (see FIG. 10). In the longer hose bridge 12b, there is also a piece of geomembrane material that extends across the top of one side of the hose bridge (i.e., the side that is on the inside of the berm wall) between gaps in the foam blocks.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A containment berm comprising:
   (a) a containment material that is durable, flexible and chemically resistant, the containment material configured to provide at least a floor and four walls of the berm, the walls forming a perimeter of the berm, the perimeter having an inside surface and an outside surface;
   (b) a plurality of quick latch stays situated around the perimeter of the berm, each quick latch stay comprising a first stay member, a second stay member, a third stay member, a latch block, and a flexible connecting member; and
   wherein the first stay member extends vertically on the outside surface of the perimeter and comprises a stay insert covered by at least one layer of geomembrane material that is heat-welded onto the outside surface of the perimeter;
   wherein the second stay member is comprised of a stay insert covered on both sides by a geomembrane material and joined to the floor of the berm by a material hinge comprised of geomembrane material;
   wherein the third stay member is situated on the floor of the berm and extends from an inside corner of the berm to a point between the material hinge and the inside corner of the berm and comprises a stay insert at least partially covered by a geomembrane material that is heat-welded onto the floor of the berm;
   wherein the latch block is situated on the inside surface of the perimeter proximate to a top edge of the perimeter and comprises a stay insert covered by at least one layer of geomembrane material that is heat-welded onto the inside surface of the perimeter;
   wherein the connecting member is comprised of at least one layer of geomembrane material that is connected at one end to the second stay member and at another end to the inside surface of the perimeter directly underneath the latch block; and
   wherein to engage the quick latch stay, a distal end of the second stay member is inserted underneath a bottom end of the latch block.

2. The containment berm of claim 1, wherein the geomembrane material comprising the floor and walls of the berm is black, and the geomembrane material of the quick latch stays is a contrasting color.

3. The containment berm of claim 1, wherein the stay inserts of the first stay member, second stay member, third stay member and latch block are comprised of TEFLON®.

4. The containment berm of claim 1, wherein the stay insert of the third stay member is shorter than the stay inserts of the first and second stay members.

5. The containment berm of claim 1, wherein the stay insert of the latch block is thicker than the stay inserts of the first stay member, second stay member and third stay member.

6. The containment berm of claim 1, wherein one end of the third stay member is open to the atmosphere to allow moisture to escape from inside of the third stay member.

7. The containment berm of claim 1, further comprising one or more hose bridges, each hose bridge being comprised of a first foam block and a second foam block that are joined by a piece of geomembrane material that extends from a top inner edge of the first foam block to a top inner edge of the second foam block and that straddles a wall of the berm.

8. The containment berm of claim 1, further comprising a hose bridge, each hose bridge being comprised of a first side and a second side, the first side of the hose bridge being situated along the outside surface of the perimeter, and the second side of the hose bridge being situated along the inside surface of the perimeter, the first side of the hose bridge comprised of a foam block, and the second side of the hose bridge being comprised of one or more foam blocks joined together by a geomembrane material that extends from a top lateral edge of one foam block to a top lateral edge of another foam block, the first and second sides of the hose bridge being joined by a geomembrane material that extends from a top inner edge of the first side of the hose bridge to a top inner edge of the second side of the hose bridges and that straddles a wall of the berm.

9. A containment berm comprising:
(a) a containment material that is durable, flexible and chemically resistant, the containment material configured to provide at least a floor and four walls of the berm, the walls forming a perimeter of the berm, the perimeter having an inside surface and an outside surface; and
(b) a plurality of quick latch stays situated around the perimeter of the berm, each quick latch stay comprising a first stay member, a second stay member, a third stay member, a latch block, and a flexible connecting member;
wherein the first stay member extends vertically on the outside surface of the perimeter and comprises a stay insert covered by at least one layer of geomembrane material that is heat-welded onto the outside surface of the perimeter;
wherein the second stay member is comprised of a stay insert covered on both sides by a geomembrane material and joined to the floor of the berm by a material hinge comprised of geomembrane material;
wherein the third stay member is situated on the floor of the berm and extends from an inside corner of the berm to a point between the material hinge and the inside corner of the berm and comprises a stay insert at least partially covered by a geomembrane material that is heat-welded onto the floor of the berm;
wherein the latch block is situated on the inside surface of the perimeter proximate to a top edge of the perimeter and comprises a stay insert covered by at least one layer of geomembrane material that is heat-welded onto the inside surface of the perimeter;
wherein the connecting member is comprised of at least one layer of geomembrane material that is connected at one end to the second stay member and at another end to a bottom end of the latch block; and
wherein to engage the quick latch stay, a distal end of the second stay member is inserted underneath a bottom end of the latch block.

* * * * *